United States Patent
Youn et al.

(10) Patent No.: US 7,656,485 B2
(45) Date of Patent: Feb. 2, 2010

(54) METHOD OF FABRICATING LIQUID CRYSTAL DISPLAY PANELS HAVING VARIOUS SIZES

(75) Inventors: Won Gyun Youn, Gyeongsangbuk-Do (KR); Su Woong Lee, Gyeongsangbuk-Do (KR); Sung Lim Nam, Seoul (KR)

(73) Assignee: LG Display Co., Ltd., Seoul (KR)

( * ) Notice: Subject to any disclaimer, the term of this patent is extended or adjusted under 35 U.S.C. 154(b) by 747 days.

(21) Appl. No.: 10/962,456

(22) Filed: Oct. 13, 2004

(65) Prior Publication Data

US 2005/0078239 A1 Apr. 14, 2005

(30) Foreign Application Priority Data

Oct. 14, 2003 (KR) .................... 10-2003-0071574

(51) Int. Cl.
*G02F 1/1337* (2006.01)
(52) U.S. Cl. ..................... 349/126; 349/187
(58) Field of Classification Search ............. 349/126, 349/187
See application file for complete search history.

(56) References Cited

U.S. PATENT DOCUMENTS

| 6,313,897 | B1 * | 11/2001 | Murayama et al. | 349/126 |
| 2003/0053021 | A1 * | 3/2003 | Lee | 349/153 |
| 2003/0169395 | A1 * | 9/2003 | Byun et al. | 349/187 |
| 2003/0231277 | A1 * | 12/2003 | Zhang | 349/187 |

FOREIGN PATENT DOCUMENTS

JP 2001189282 A * 7/2001

* cited by examiner

*Primary Examiner*—Michael H Caley
(74) *Attorney, Agent, or Firm*—Birch, Stewart Kolasch & Birch LLP (57) ABSTRACT

A method of fabricating a liquid crystal display panel, includes providing a mother substrate having a plurality of display panel regions of different sizes, and forming a plurality of display panel substrates each formed at one of the display panel regions, parts of the display panel substrates to be rubbed being aligned to one side of the mother substrate where rubbing is to start.

7 Claims, 4 Drawing Sheets

METHOD OF FABRICATING LIQUID CRYSTAL DISPLAY PANELS HAVING VARIOUS SIZES

This application claims the benefit of Korean Patent Application No. 2003-71574, filed Oct. 14, 2003, under 35 U.S.C. § 119, the entire contents of which are herein fully incorporated by reference.

BACKGROUND OF THE INVENTION

1. Field of the Invention

The present invention relates to a method of fabricating a liquid crystal display device, and particularly, to a method of fabricating a liquid crystal display panel capable of preventing rubbing from being abnormally made due to a step difference by disposing liquid crystal display panels of various sizes with their pixel parts made to correspond to one side.

2. Description of the Related Art

In recent information society, a display is considered to be more and more important as a visual information transmission media. In order to occupy a major position in the future, the display has to satisfy a low power consumption characteristic, a thin and light characteristic, a high picture quality characteristic, etc. Because a liquid crystal display (LCD) device (a major product of a flat panel display (FPD)) is equipped with not only functions to satisfy said conditions but also with a mass production characteristic, various kinds of new products using the LCD device are rapidly being invented, and the LCD device has become a core component which can replace the existing cathode ray tube (CRT).

A general liquid crystal display device displays an image by controlling light transmittance by using an electric field. To this end, the liquid crystal display device includes a liquid crystal display panel including a driving circuit part, a backlight part installed at a lower portion of the liquid crystal display panel, a mold-frame for supporting the backlight part and the liquid crystal display panel, and a case.

Hereinafter, a general liquid crystal display panel will now be described in detail with reference to FIG. 1.

Figure 1:
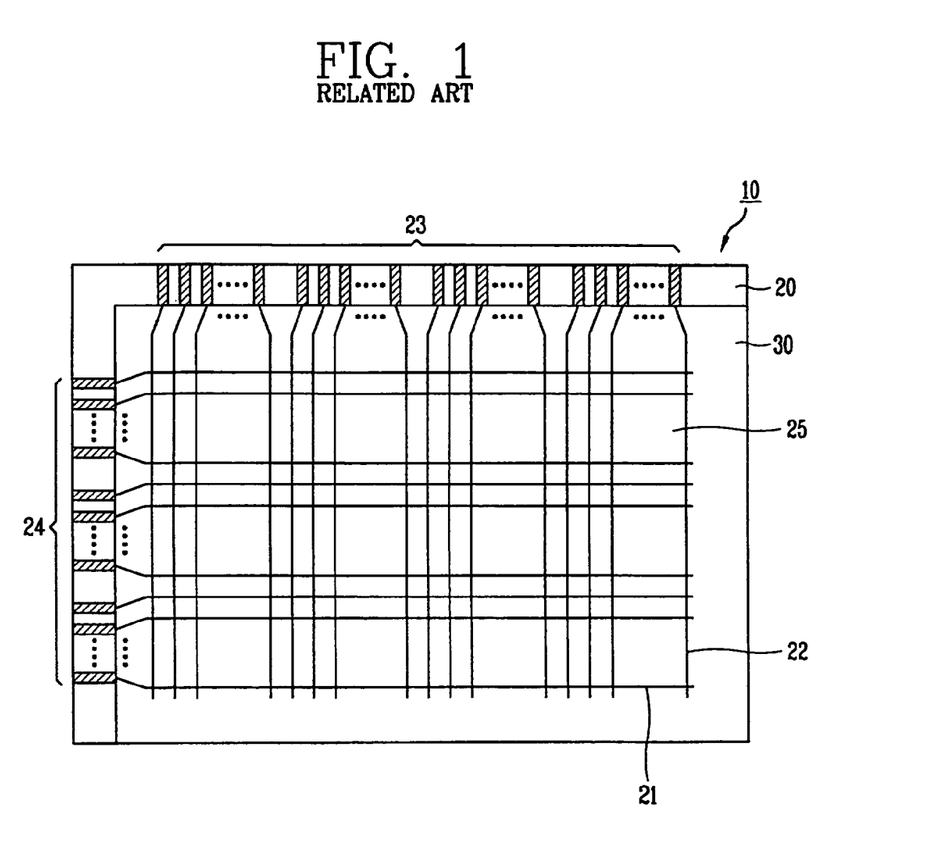
FIG. 1 is a plan view roughly showing a structure of a general liquid crystal display panel.

FIG. 1 is a plan view roughly showing a structure of a general liquid crystal display panel.

As shown therein, the liquid crystal display panel 10 largely includes an array substrate 20, a color filter substrate 30 and a liquid crystal layer formed between the array substrate 20 and the color filter substrate 30.

The array substrate 20 includes a plurality of gate lines 21 and a plurality of data lines 22 that define a plurality of pixel regions 25 by being arranged vertically and horizontally on the substrate 20, a plurality of thin film transistors (TFTs) each formed at an intersection of the corresponding gate line 21 and the corresponding data line 22 and a plurality of pixel electrodes formed in the pixel regions 25.

Here, the array substrate 20 has a region along a long side and a region along a short side that protrude beyond the color filter substrate 30 so that the driving circuit unit for driving the liquid crystal display panel is positioned thereto. Particularly, a gate pad part 24 is formed in the region along the short side region of the array substrate 20, and a data pad part 23 is formed in the region along the long side region of the array substrate 20.

In addition, the gate pad part 24 supplies a scanning signal, which is supplied from a gate driving circuit part (not shown), to the gate line 21 of each pixel region 25 of the pixel part, an image-displayed region. The data pad part 23 supplies image information, which is supplied from a data driving circuit part (not shown), to a data line 22 of the pixel region 25.

Even though it is not shown in FIG. 1, a color filter for implementing colors and a common electrode facing the pixel electrodes formed on the array substrate 20 are formed at an image-displayed region of the color filter substrate 30.

The array substrate 20 and the color filter substrate 30 constructed as above face each other and are attached by a sealant (not shown) formed along an outer edge of the image-displayed region. The attachment of the two substrates is made through an attachment key (not shown) formed at the array substrate 20 or the color filter substrate 30.

This process of fabricating the liquid crystal display device can be divided into an array substrate process for forming a switching device on an array substrate, a color filter substrate process for forming a color filter on a color filter substrate and a cell process. The process for fabricating the liquid crystal display device will now be described with reference to FIG. 2.

Figure 2:
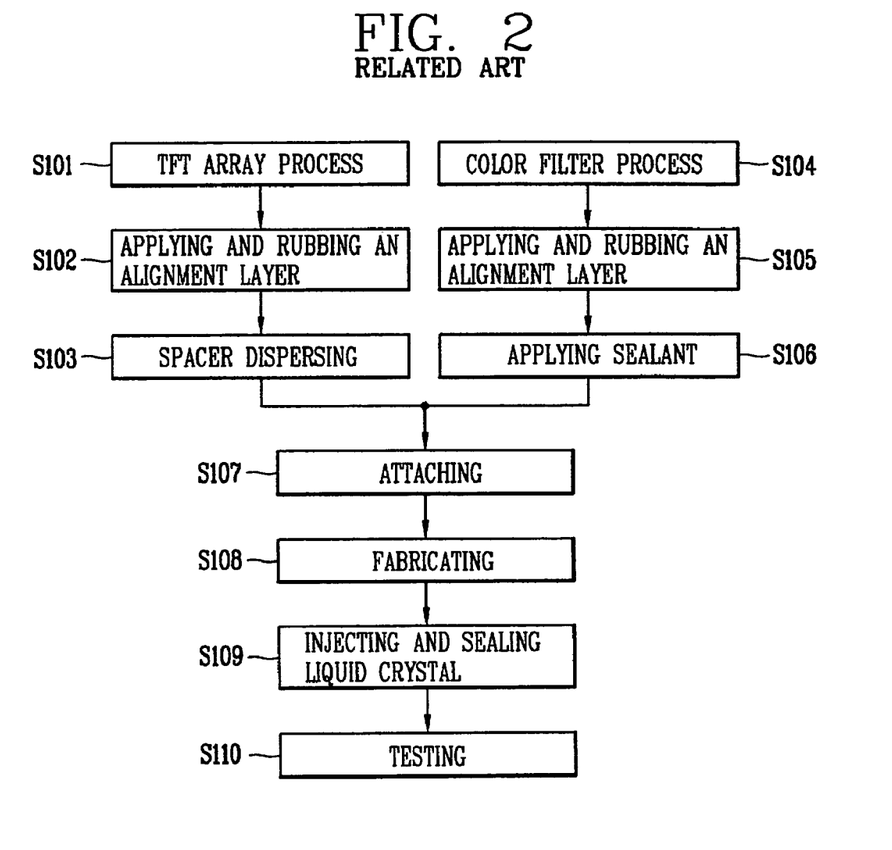
FIG. 2 is a flow chart showing a fabrication process of the liquid crystal display panel shown in FIG. 1.

First, a plurality of gate lines and a plurality of data lines are arranged vertically and horizontally on a transparent insulation substrate such as glass to thereby define a plurality of pixel regions, and a thin film transistor (a switching element) connected to the corresponding gate line and the corresponding data line, is formed at each pixel region (S101). In addition, a pixel electrode connected to the corresponding thin film transistor and driving a liquid crystal layer as a signal is applied thereto through the thin film transistor, is formed at each pixel region through the array substrate process (S101).

In addition, a color filter including sub-color filters (R, G, B) for implementing colors, a black matrix for isolating the sub color filter from other sub color filters and cutting off light transmitted by a liquid crystal layer and a transparent common electrode corresponding to the pixel electrode are formed on the color filter substrate by the color filter substrate process (S104).

Then, alignment layers are applied over the array substrate and the color filter substrate, respectively, and then the alignment layers are rubbed in order to provide an alignment controlling force or a surface anchoring force (i.e., pretilt angle and alignment direction) to the liquid crystal molecules of the liquid crystal layer formed between the array and color filter substrates (S102, S105).

Next, spacers for maintaining a uniform cell gap are dispersed onto the array substrate, a sealing material is applied along an outer edge portion of the color filter substrate, and then the array substrate and the color filter substrate are attached by applying pressure thereto (S103, S106, S107).

At steps S101 and S104, the array substrate and the color filter substrate are formed respectively on large-sized mother glasses (i.e., mother substrates). Namely, a plurality of panel regions are formed on the large-sized mother substrate and a plurality of thin film transistors which are switching devices or a color filter layer are respectively formed at the panel regions. Therefore, in order to fabricate individual liquid crystal display panels, the mother substrates that are attached at step S107 are cut and processed to form individual liquid crystal display panels (S108).

Thereafter, a liquid crystal material is injected into each of the individual processed liquid crystal display panels through a liquid crystal injection opening, then the liquid crystal injection opening is encapsulated to form the liquid crystal layer, and finally, the injected liquid crystal display panel is tested, thereby completing the liquid crystal display panel (S109, S110).

In fabricating such a liquid crystal display panel, in order to improve productivity, a method of simultaneously disposing a plurality of unit liquid crystal display panels on a large-sized mother substrate is generally being used.

Figure 3A:
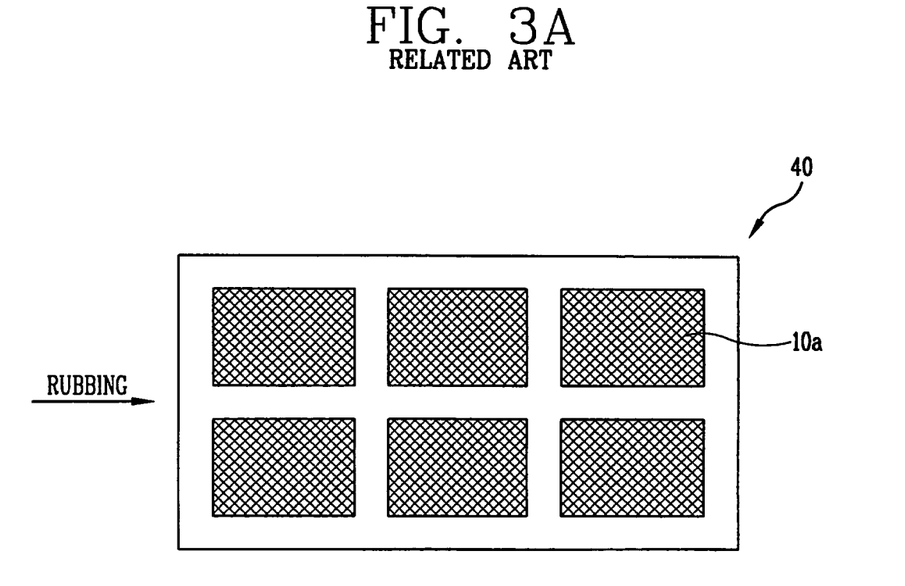
FIGS. 3A and 3B are views showing that a plurality of liquid crystal display panel regions are disposed on a mother substrate according to a related art.
Figure 3B:
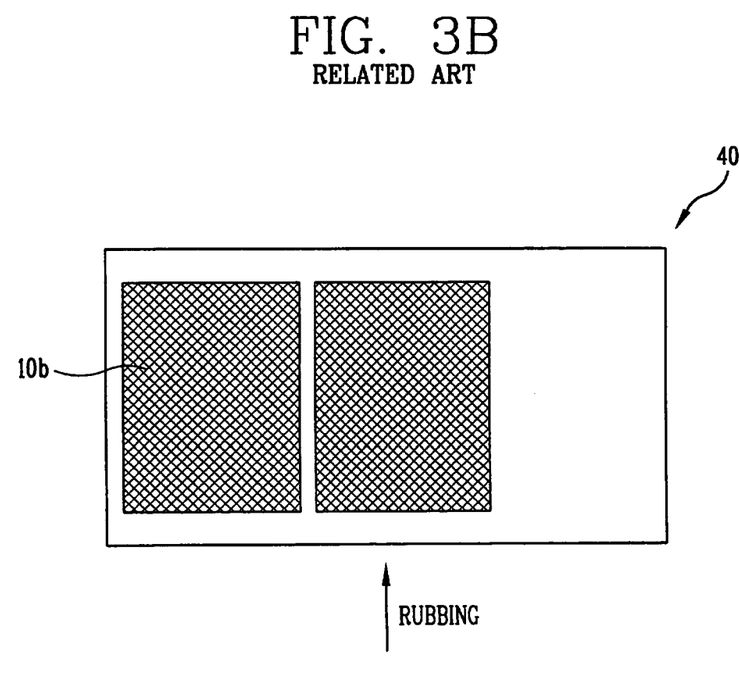

FIG. 3A is a view showing that a plurality of liquid crystal display panel regions in one same size are disposed on a mother substrate, and FIG. 3B is a view showing that liquid crystal display panel regions in one bigger same size are disposed on the mother substrate compared to the panel regions of FIG. 3A.

FIG. 3A shows a case that six liquid crystal display panel regions are disposed at regular intervals, considering the size of the mother substrate and the size of the liquid crystal display panels to be formed. That is, as shown therein, six first liquid crystal display panel regions 10a having the same size are disposed on the mother substrate 40. A TFT array substrate or a color filter substrate is formed at each region 10a.

Once the mother substrate having the array substrates and the mother substrate having the color filter substrates are attached to each other to form first liquid crystal display panels and then processed to separate the first liquid crystal display panels, leaving behind a region of the mother substrates where the liquid crystal display panels are not formed and which is discarded after the separation. Accordingly, preferably, the first liquid crystal display panels are disposed to minimize the region where the liquid crystal display panels are not formed and to maximize the number of liquid crystal display panel regions provided on the mother substrates.

Here, each first liquid crystal display panel region 10a having the array substrate or the color filter substrate has to pass through a rubbing process in order to provide an alignment controlling force to liquid crystal molecules. In the drawing, a case that the rubbing is made in an arrow direction regardless of a driving mode of a liquid crystal display panel (i.e., Twisted Nematic; TN) mode, an In-Plane Switching (IPS) mode or a S (super)-IPS mode, is depicted.

For an additional reference, a liquid crystal display panel is a display device for displaying an image by controlling the amount of light transmitted by a liquid crystal layer. The transmission level is controlled by an initial alignment state of the liquid crystal molecules having a double refraction property and by driving the liquid crystal molecules according to a signal. Driving modes of a liquid crystal display panel are determined by an initial alignment direction and the method of driving the liquid crystal molecules. Namely, because liquid crystal display panels with different modes have different initial alignment directions, the directions of the alignment layers have to be different.

Therefore, panel regions with different modes, which are formed on a substrate (array substrate and color filter substrate), have to be rubbed in different directions.

In addition, because a main viewing angle of the fabricated first liquid crystal display panel is determined according to a direction of rubbing made on the mother substrate 40, the panel regions 10a have to be disposed in the same direction in order to simultaneously fabricate the plurality of liquid crystal display panels having the same main viewing angle.

In case of fabricating bigger-sized liquid crystal display panels on the same mother substrate of FIG. 3A, only two second liquid crystal display panel regions 10b of the same size can be disposed on each mother substrate 40 as shown in FIG. 3B, and a region of the mother substrate 40 where the second liquid crystal display panel regions 10b are not disposed has to be discarded subsequently.

Accordingly, as the size of the liquid crystal display panels increases, the efficiency of using the mother substrate is deteriorated, which deteriorates productivity and increases product cost.

Here, when the second liquid crystal display panel regions 10b having the array substrate/color filter substrate are disposed as shown in the drawing, rubbing has to be made in a direction perpendicular to the direction of rubbing depicted in FIG. 3A. The arrangement direction of the array substrates and the color filter substrates on the mother substrates are made without regard to their pixel parts.

In general, a plurality of liquid crystal display panels (e.g., four, six, eight or sixteen liquid crystal display panels) are formed on a mother substrate and a technique for forming the plurality of liquid crystal display panels on the mother substrate are considered to be a main factor that determines fabrication efficiency of the liquid crystal display panel. Accordingly, researches on the techniques for efficiently using a mother substrate are actively ongoing, and these techniques affect competitiveness of liquid crystal display device manufacturers.

However, the size of the mother substrate 40 is standardized and depends on the size of the liquid crystal display panel being fabricated. Namely, the standard size of the mother substrate is set so that the mother substrate has an area to efficiently fabricate the liquid crystal display panels. As such, as shown in FIG. 3B, if a liquid crystal display panel with a different size is fabricated on the standard sized mother substrate, a large region of the mother substrate remains unused. This problem may be solved by forming the liquid crystal display panel on a mother substrate with a standard sized corresponding to the liquid crystal display panel to be made. But, there is no mother substrate that is standardized according to the liquid crystal display panel to be made, so the liquid crystal display panel must be formed on a mother substrate with a different standard as shown in FIG. 3B. Accordingly, a large portion of the mother substrate remains unused and the unused region of the mother substrate is discarded, thereby increasing the fabrication cost of the liquid crystal display panel.

In addition, if a plurality of liquid crystal display panels are disposed on the mother substrate, randomly (without any regular directionality) in order to improve the efficiency of using the mother substrate, the surface of the panel may be easily damaged during a rubbing process. That is, if a rubbing is made on the substrate on which a plurality of liquid crystal panels are disposed randomly, a blotted region may be generated due to a step difference because positions where rubbing is started and completed are varied according to the liquid crystal display panels.

SUMMARY OF THE INVENTION

Accordingly, the present invention is directed to a method and substructure that substantially obviate one or more of the problems due to limitations and disadvantages of the related art.

An object of the present invention is to provide a method of fabricating liquid crystal display panels capable of preventing rubbing from being made abnormally due to a step difference, by disposing liquid crystal display panels having various sizes with their pixel parts corresponding at one side.

Another object of the present invention is to provide a method of fabricating liquid crystal display panels capable of efficiently using a mother substrate by optimally disposing liquid crystal display panels having various sizes on the mother substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, according to an aspect, there is provided a method of fabricating a liquid crystal display panel, comprising providing first and second mother substrates each divided into a plurality of panel regions, respectively disposing a plurality of array substrates and a plurality of color filter substrates having different sizes on the panel regions of the first and second mother substrates with their pixel parts aligned to at least one side of the respective mother substrate, conducting an array substrate process and a color filter substrate process on the plurality of array substrates and the plurality of color filter substrates, respectively, forming alignment layers on the array substrates and the color filter substrates, producing alignment directions in the alignment layers formed on the array substrates and the color filter substrates by conducting a rubbing process, and attaching the first and second mother substrates on which the array substrates and the color filter substrates are disposed and separating the attached mother substrates into a plurality of unit liquid crystal display panels.

According to another aspect of the present invention, there is provided a method of fabricating a display panel substrate of a liquid crystal display, comprising providing a mother substrate divided into a plurality of panel regions, disposing a plurality of display panel substrates having different sizes on the panel regions of the mother substrate with their pixel parts corresponding to at least one side, conducting a substrate process on the plurality of display panel substrates, forming alignment layers on the display panel substrates, producing alignment directions in the alignment layers formed on the display panel substrates by conducting a rubbing process, and separating the mother substrate into a plurality of unit display panel substrates.

According to another aspect of the present invention, there is provided a mother substrate structure comprising, a mother substrate having a plurality of display panel regions of different sizes, and a plurality of display panel substrates each formed at one of the display panel regions, parts of the display panel substrates to be rubbed being aligned to one side of the mother substrate where rubbing is to start.

According to another aspect of the present invention, there is provided a method of forming display panel substrates, comprising providing a mother substrate having a plurality of display panel regions of different sizes, and forming a plurality of display panel substrates each formed at one of the display panel regions, parts of the display panel substrates to be rubbed being aligned to one side of the mother substrate where rubbing is to start.

It is to be understood that both the foregoing general description and the following detail description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments, examples of which are illustrated in the accompanying drawings.

In general, a plurality of liquid crystal display panels, for example, 4, 6, 8 or 16 liquid crystal display panels are formed on a pair of mother substrates and the techniques for forming a plurality of liquid crystal display panels on the pair of mother substrates affect the fabrication efficiency of the liquid crystal display panels.

In the related art, the same-sized liquid crystal display panels are formed on a pair of mother substrates in general, but, when the same-sized liquid crystal panels are formed on a pair of mother substrates with a different standard, deterioration of efficiency of using the mother substrate is caused, thereby causing deterioration in productivity and an increase in fabrication cost.

Therefore, the present invention provides a method of fabricating liquid crystal display panels allowing the efficiency of using a mother substrate to be improved greatly by disposing a plurality of liquid crystal display panels of different sizes on a pair of mother substrates.

Accordingly, the present invention provides a method of fabricating liquid crystal display panels which can prevent damage due to a step difference by disposing a plurality of liquid crystal display panels having different sizes on a pair of mother substrates with their pixel parts corresponding to one side. For instance, the plurality of array substrates of liquid crystal display panels are disposed with their image-displayed regions (i.e., pixel parts) corresponding at one side at least, and a rubbing process is conducted in such a manner that rubbing is started or completed on the basis of the corresponding side, so that rubbing being abnormally performed due to a step difference is minimized or eliminated.

Hereinafter, a preferred embodiment of a method of fabricating liquid crystal display panels in accordance with the present invention will now be described with reference to accompanying drawings.

Figure 4:
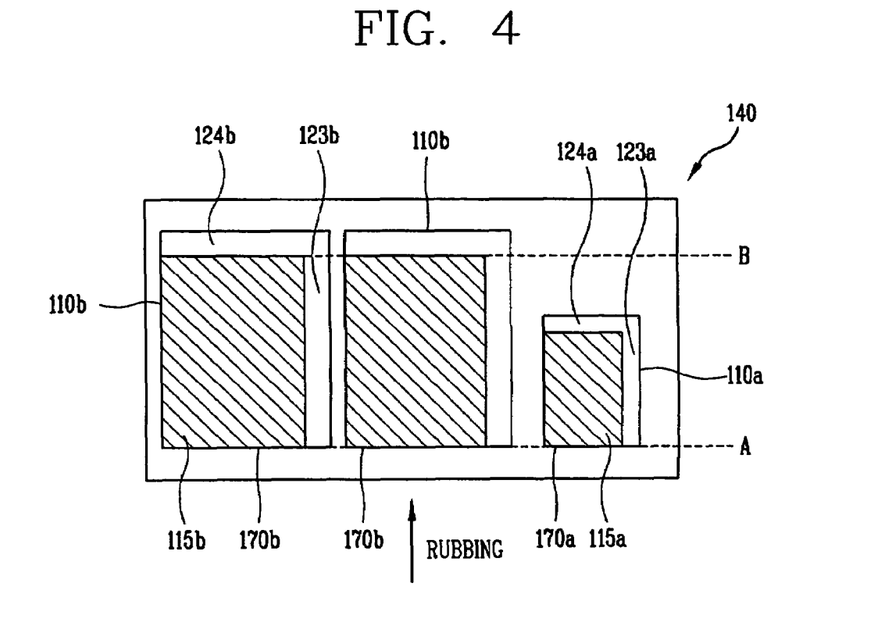
FIG. 4 is a view showing a plurality of liquid crystal display panel regions and substrates having different sizes as disposed on a mother substrate in accordance with a first embodiment of the present invention.

FIG. 4 is a view showing a plurality of liquid crystal display panel regions and substrates having different sizes as disposed on a mother substrate in accordance with the first embodiment of the present invention.

As shown therein, a first liquid crystal display panel region 110a and second liquid crystal display panel regions 110b are disposed on a large-sized mother substrate 140. The size of the first liquid crystal display panel region 110a is different (i.e., smaller than) from the size of the second liquid crystal display panel regions 110b. All the second liquid crystal display panel regions 110b have the same size. An array substrate (e.g., a TFT array substrate) or a color filter substrate is formed at each of the first and second display panel regions 110a and 110b. Generally, one mother substrate has only array substrates, and another mother substrate has only color filter substrates. Each of the array/color filter substrates includes a pixel part 115a, 115b associated with a plurality of pixel regions having pixel electrodes. The pixel parts 115a and 115b correspond to one side (A). That is, one first liquid crystal display panel region 110a having a first size and two second liquid crystal display panel regions 110b having a second size are disposed on the mother substrate 140, and the plurality of liquid crystal display panel substrates (i.e., array/color filter substrates) are disposed with their pixel parts 115a and 115b aligned to one side (A) of the mother substrate 140 where rubbing is started.

Here, the first embodiment gives an example that array substrates 170a and 170b including driving circuit parts are disposed at the display panel regions 110a and 110b on the mother substrate 140. Each array substrate 170a, 170b includes a driving circuit part such as a gate pad part 124a, 125b and a data pad part 123a, 123b, and the pixel part 115a, 115b, requiring a rubbing process. A step difference is generated between the pixel parts 115a, 115b and the driving circuit part.

In addition, rubbing of the panel substrates starts from one side (A) of the mother substrate at which the pixel parts 115a and 115b are aligned as indicated by the arrow direction depicted in FIG. 4 and ends at the opposite side of the mother substrate.

The rubbing direction is a main condition that affects a main viewing angle of a liquid crystal display panel being fabricated, and the panels must be positioned in the same direction in order to simultaneously fabricate a plurality of liquid crystal display panels having the same main viewing angles.

In addition, unlike the rubbing direction, an angle between the rubbing direction and a rubbing cotton (not shown) affects a driving mode of a liquid crystal display panel being fabricated. This will now be described.

A general display operation mode of a liquid crystal display panel is a normal white mode using a twisted nematic liquid crystal. In the twisted nematic (TN) mode liquid crystal display panel, horizontal alignment layers are formed on a pair of electrodes (i.e., pixel electrode and common electrode), and the pair of horizontal alignment layers are aligned in directions orthogonal to each other. Specifically, in the TN mode, the alignment directions of alignment layers respectively formed on an array substrate and a color filter substrate cross each other to be symmetric with reference to, for example, gate lines.

Unlike the TN mode, in an in-plane switching (IPS) mode, the alignment directions of alignment layers respectively formed on an array substrate and a color filter substrate are respectively formed to be parallel to the direction in which, for example, data lines extend. In the IPS mode, the alignment directions may be formed at an angle to the data lines (for example, about 15°~20°), but the alignment directions of the array substrate and the color filter substrate have to be substantially parallel.

Unlike the mother substrate depicted in FIG. 3B on which only two liquid crystal display panels (which have the same size as the second liquid crystal display panels of FIG. 4) are disposed, on the same-sized mother substrate 140 three liquid crystal display panel substrates are disposed in accordance with the first embodiment so that more liquid crystal display panels may be fabricated with the same mother substrate cost. Accordingly, the fabrication cost of the liquid crystal display panels is effectively reduced.

According to the first embodiment, a plurality of liquid crystal display panel substrates (i.e., array substrates and/or color filter substrates) of various sizes may be formed on a single mother substrate. That is, specifically, the liquid crystal display panel substrates of various sizes that most efficiently occupy the mother substrate may be formed on the mother substrate with their pixel parts aligned to one side depending on the rubbing direction. Various liquid crystal display panels for televisions, notebook computers, or mobile phones can be formed efficiently using the present technique.

However, when liquid crystal display panel substrates of various sizes are disposed on a mother substrate to have the same main viewing angle in accordance with the first embodiment, a region of the mother substrate where the liquid crystal display panel substrates are not formed is left behind and discarded after the panel separation.

In addition, if rubbing is made with the pixel parts of the display panel substrates aligned at only one side from which the rubbing is started, rubbing may not be made effectively due to a step difference generated at a side where the rubbing has ended. This may cause a problem in that a dummy pattern, which is the same as the pattern of the panel, may be formed at a region of the mother substrate where the liquid crystal display panel is not formed.

Accordingly, a second embodiment of the present invention is provided wherein the liquid crystal display panel substrates are disposed with their pixel parts made to correspond at both sides of the mother substrate where rubbing is started and ended.

Figure 5:
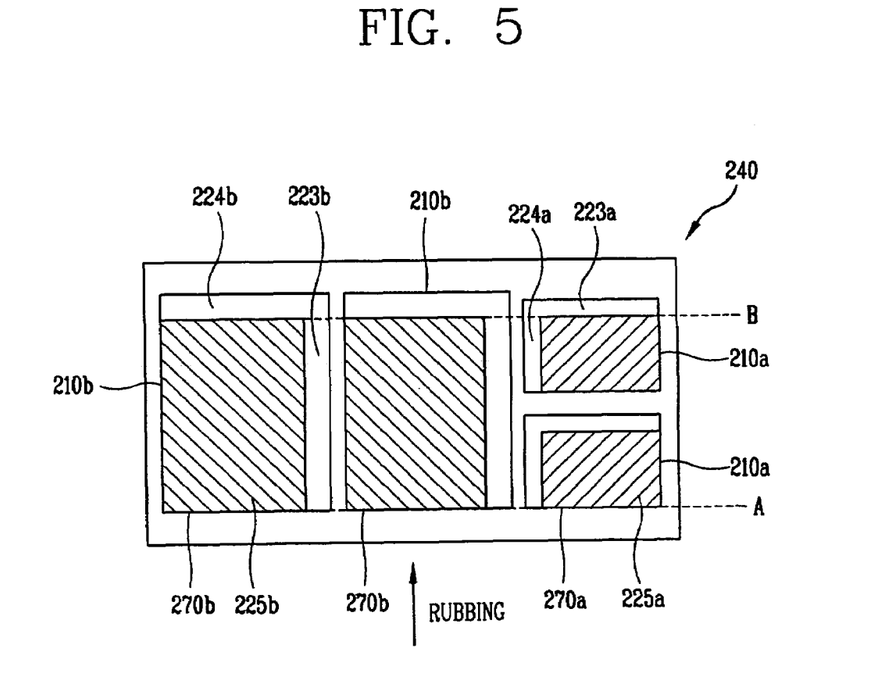
FIG. 5 is a view showing a plurality of liquid crystal display panel regions and substrates having different sizes as disposed on a mother substrate in accordance with a second embodiment of the present invention.

FIG. 5 is a view showing a plurality of liquid crystal display panel substrates and regions having different sizes as disposed on a mother substrate in accordance with the second embodiment of the present invention, wherein the plurality of liquid crystal display panel substrates are disposed with their pixel parts aligned to both sides of the mother substrates, one side (A) where the rubbing starts and the other side (B) where the started rubbing ends.

As shown therein, two first liquid crystal display panel regions 210a of a first size are disposed on a large-sized mother substrate 240, and two second liquid crystal display panel regions 210b of a second size are also disposed on the mother substrate 240. At each of the first liquid crystal display panel regions 210a and second liquid crystal display panel regions 210b, an array substrate or a color filter substrates may be formed as in the first embodiment. Each of the array/color filter substrates includes a pixel part 225a, 225b. In this example, the array substrates 270a and 270b are formed at the display panel regions 210a and 210b, and are the same as the array substrates 170a and 170b in FIG. 4. For instance, each array substrate 270a, 270b includes a driving circuit part such as a gate pad part 224a, 224b and a data pad part 223a, 223b, and a pixel part 225a, 225b. The liquid crystal display panel substrates are disposed with their pixel parts 225a and 225b aligned to both sides (A and B) where rubbing is started and ended on the basis of the second liquid crystal display panel substrates 270b.

Here, the liquid crystal display panel substrates 270a and 270b are rubbed from one side (A) at which the pixel parts 225a and 225b correspond, that is, from a position where rubbing is started as indicated by the arrow direction depicted in FIG. 5.

Unlike the first embodiment where only three liquid crystal display panel substrates are disposed on the mother substrate as depicted in FIG. 4, in the second embodiment, four liquid crystal display panel substrates are disposed on the same-sized mother substrate 240 so that more liquid crystal display panels can be fabricated with the same mother substrate cost. Accordingly, the fabrication cost of the liquid crystal display panels is further reduced.

In the second embodiment, liquid crystal display panels having different main viewing angles are fabricated because the first liquid crystal display panel substrates and the second liquid crystal display panel substrates are disposed on the mother substrate 240 in directions different from each other. Even so, because a required main viewing angle is varied according to how a liquid crystal display panel is used, it causes no problem if the liquid crystal display panel substrates are properly disposed according to their use.

In addition, if the liquid crystal display panel substrates are disposed with their pixel parts corresponding at both sides where rubbing is started and completed as described above, the rubbing can be prevented from being abnormally made due to a step difference without a formation of a dummy pattern.

Liquid crystal display panel substrates efficiently disposed on a large-sized mother substrate in accordance with the first or second embodiment are fabricated and processed through the same process depicted in FIG. 2 to form multiple liquid crystal display panels, and this will now be briefly described.

First, once the display panel regions have been defined on each of a pair of mother substrates as shown in FIGS. 4 and 5, color filter substrates at the display panel regions (i.e., 110a and 110b, or 210a and 210b) of one mother substrate and array substrates at the display panel regions of the other mother substrates are formed. This can be accomplished as follows. A plurality of gate lines and a plurality of data lines are arranged by an array substrate process to define a plurality of pixel regions, and thin film transistors (switching elements) connected to the gate lines and the data lines are formed at the pixel regions. In addition, pixel electrodes each connected to the corresponding thin film transistor and driving a liquid crystal layer as a signal is applied through the thin film transistor, are formed through the array substrate process, to form each array substrate.

In addition, a color filter including sub color filters (R, G, B) for implementing colors, a black matrix isolating the sub color filter from other sub color filters and cutting off light transmitted by a liquid crystal layer and a common electrode which faces the pixel electrode are formed on a color filter through a color filter substrate process, to form each color filter substrate.

Next, alignment layers are respectively applied onto the array substrate and the color filter substrates, and then the alignment layers are rubbed in order to provide an alignment controlling force or a surface anchoring force (i.e., pretilt angle and alignment direction) to liquid crystal molecules of each liquid crystal layer formed between the corresponding array and color filter substrates.

Then, spacers for maintaining a uniform cell gap are dispersed onto each array substrate, a sealing material is applied along an outer edge portion of each color filter substrate, and then the mother substrate having the array substrates and the other mother substrate having the color filter substrates are respectively attached to each other by applying pressure thereto.

Next, the attached mother substrates are cut and processed to fabricate individual liquid unit crystal display panels, a liquid crystal material is injected into each of the individual liquid crystal display panels through a liquid crystal injection opening, then the liquid crystal injection opening is encapsulated to form the liquid crystal, and finally, the injected liquid crystal display panels are tested. In such a manner, liquid crystal display panes of various sizes are effectively and simultaneously fabricated.

In the above-described method, by injecting liquid crystal into individual liquid crystal display panels by vacuum injection, liquid crystal display panels are completed. But, the present invention may be employed not only by using the vacuum injection method but also by using a liquid crystal dispensing method of directly dropping liquid crystal onto the mother substrate.

Although according to an embodiment of the present invention, the pair of mother substrates respectively having the array substrates and the color filter substrates are attached to each other and then cut to form and separate unit display panels, each mother substrate may be cut to separate the display panel substrates formed thereon and then the separated display panel substrates may be attached to each other to form the unit display panels.

As so far described, in the method of fabricating a liquid crystal display panel in accordance with the present invention, because liquid crystal display panel substrates having various sizes are disposed on one mother substrate with their pixel parts corresponding to at least one side of the mother substrate, e.g., depending on the rubbing direction, the mother substrate can be efficiently used, thereby reducing the fabrication cost and simultaneously preventing rubbing from being abnormally performed due to a step difference.

In addition, because liquid crystal display panel substrates having various sizes are disposed on one mother substrate, liquid crystal display panels having sizes different from each other can be simultaneously fabricated on one fabrication line.

It will be apparent to those skilled in the art that various modifications and variations can be made in the present invention without departing from the sprit or scope of the invention. Thus, it is intended that the present invention covers the modifications and variations of this invention provided they come within the scope of the appended claims and their equivalents.

What is claimed is:

1. A method of fabricating a liquid crystal display panel, comprising:

disposing a plurality of first liquid crystal display panel regions having a first size and a plurality of second liquid crystal display panel regions having a second size different from the first size on mother substrates, wherein a plurality of array substrates and a plurality of color filter substrates are formed at the plurality of first and second liquid crystal display panel regions and each of the array substrates and color filter substrates includes a pixel part, a first pad part and a second pad part, and wherein the first liquid crystal display panel region and the second liquid crystal display panel region are disposed on the mother substrates in directions different from each other;

conducting an array substrate process and a color filter substrate process on the plurality of array substrates and the plurality of color filter substrates, respectively;

forming alignment layers on the array substrates and the color filter substrates;

rubbing the plurality of first liquid crystal display panel regions and the plurality of second liquid crystal display panel regions from one imaginary line (A) to other imaginary line (B) of the mother substrates, wherein the rubbing is performed in a direction substantially perpendicular to the first pad part of the plurality of first liquid crystal display panel regions and the second pad part of the plurality of second liquid crystal display panel regions, and substantially parallel to the second pad part of the plurality of first liquid crystal display panel regions and the first pad part of the plurality of second liquid crystal display panel regions so that the plurality of first liquid crystal display panel regions and the plurality of second liquid crystal display panel regions have different main viewing angles; and attaching the mother substrates on which the array substrates and the color filter substrates are disposed and separating the attached mother substrates into a plurality of unit liquid crystal display panels, wherein the plurality of first liquid crystal display panel regions and some second liquid crystal display panel regions are disposed with their pixel parts aligned to the one imaginary line (A) across the mother substrates where the rubbing starts and the plurality of first liquid crystal display panel regions and some second liquid crystal display panel regions are disposed with their pixel parts aligned to the other imaginary line (B) across the mother substrates where the started rubbing ends on the basis of the second liquid crystal display panel regions.

2. The method of claim 1, wherein the step of conducting the array substrate process comprises:

forming a plurality of gate lines and a plurality of data lines defining a plurality of pixel regions on each of the array substrates;

forming a switching element at each pixel region of each of the array substrates; and forming a pixel electrode at each pixel region of each of the array substrates.

3. The method of claim 1, wherein the step of conducting the color filter substrate process comprises:

forming a color filter and a black matrix at each of the color filter substrates; and forming a common electrode on each of the color filter substrates.

4. The method of claim 1, further comprising:

dispersing spacers onto each of the array substrates before the attaching step.

5. The method of claim 1, wherein the attaching and separating steps include:

applying a sealing material along an outer edge portion of each of the color filter substrates;

attaching the mother substrates on which the array substrate and the color filter substrate are disposed, to each other;

cutting the attached mother substrates into the plurality of unit liquid crystal display panels; and forming a liquid crystal layer between the array substrate and the color filter substrate of each of the unit liquid crystal display panels.

6. The method of claim 1, wherein each of the unit liquid crystal display panels has a twisted nematic mode, an in-plane switching mode, or a vertical alignment mode.

7. The method of claim 1, wherein the array substrate process or the color filter substrate process is conducted on one fabrication line.

* * * * *